(12) United States Patent
Park et al.

(10) Patent No.: US 12,198,032 B2
(45) Date of Patent: Jan. 14, 2025

(54) ELECTRONIC DEVICE AND CONTROL METHOD THEREFOR

(71) Applicant: Samsung Electronics Co., Ltd., Suwon-si (KR)

(72) Inventors: Chiyoun Park, Suwon-si (KR); Jaedeok Kim, Suwon-si (KR); Hyunjoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 866 days.

(21) Appl. No.: 17/286,982

(22) PCT Filed: Nov. 25, 2019

(86) PCT No.: PCT/KR2019/016235
§ 371 (c)(1),
(2) Date: Apr. 20, 2021

(87) PCT Pub. No.: WO2020/149511
PCT Pub. Date: Jul. 23, 2020

(65) Prior Publication Data
US 2021/0383190 A1     Dec. 9, 2021

Related U.S. Application Data

(60) Provisional application No. 62/793,497, filed on Jan. 17, 2019.

(30) Foreign Application Priority Data

Sep. 26, 2019 (KR) .................. 10-2019-0118918

(51) Int. Cl.
*G06N 3/04* (2023.01)
*G06N 20/00* (2019.01)

(52) U.S. Cl.
CPC ............... *G06N 3/04* (2013.01); *G06N 20/00* (2019.01)

(58) Field of Classification Search
CPC .......... G06N 3/04; G06N 3/045; G06N 3/082
See application file for complete search history.

(56) References Cited

U.S. PATENT DOCUMENTS 5,253,327 A    10/1993   Yoshihara
8,086,052 B2   12/2011   Toth et al.
(Continued)

FOREIGN PATENT DOCUMENTS

CN    101414351 A    4/2009
CN    106548234 A    3/2017
(Continued)

OTHER PUBLICATIONS

Gao, Xitong, et al. "Dynamic channel pruning: Feature boosting and suppression." arXiv preprint arXiv:1810.05331 (2018). (Year: 2018).*
(Continued)

*Primary Examiner* — Michael J Huntley
*Assistant Examiner* — Sehwan Kim
(74) *Attorney, Agent, or Firm* — Jefferson IP Law, LLP

(57) ABSTRACT

An electronic device and a control method therefor are provided. The electronic device may comprise: a memory for storing at least one instruction; and a processor connected to the memory so as to control the electronic device, wherein the processor: by executing the at least one instruction, appends a second layer including a learnable function to a first layer in an artificial neural network including a plurality of layers; updates a parameter value included in the second layer by learning of the artificial neural network; acquires a function value by inputting the updated parameter value to the learnable function; and eliminates at least one channel among a plurality of channels included in the first
(Continued)

layer on the basis of the acquired function value so as to achieve update to a third layer.

7 Claims, 10 Drawing Sheets

(56) References Cited

U.S. PATENT DOCUMENTS

| | | | |
|---|---|---|---|
| 8,463,722 | B2 | 6/2013 | Knoblauch |
| 10,380,484 | B2 | 8/2019 | Goel et al. |
| 10,819,844 | B2 | 10/2020 | Kim et al. |
| 11,055,320 | B2 | 7/2021 | Chandna et al. |
| 11,132,621 | B2 | 9/2021 | Botea et al. |
| 2003/0174872 | A1 | 9/2003 | Chalana et al. |
| 2003/0174881 | A1 | 9/2003 | Simard et al. |
| 2015/0332171 | A1 | 11/2015 | Nakagawa |
| 2016/0358070 | A1 | 12/2016 | Brothers et al. |
| 2017/0169326 | A1 | 6/2017 | Diamos et al. |
| 2017/0293757 | A1 | 10/2017 | Rosenman et al. |
| 2017/0330076 | A1 | 11/2017 | Valpola |
| 2018/0046915 | A1 | 2/2018 | Sun et al. |
| 2018/0107925 | A1 | 4/2018 | Choi et al. |
| 2018/0114110 | A1 | 4/2018 | Han et al. |
| 2018/0114114 | A1 | 4/2018 | Molchanov et al. |
| 2018/0189950 | A1 | 7/2018 | Norouzi et al. |
| 2018/0247193 | A1 | 8/2018 | Holtham |
| 2018/0336468 | A1 | 11/2018 | Kadav et al. |
| 2018/0357538 | A1 | 12/2018 | Hwang et al. |
| 2018/0373975 | A1* | 12/2018 | Yu .................. G06N 3/082 |
| 2019/0080241 | A1 | 3/2019 | Guo et al. |
| 2019/0114391 | A1 | 4/2019 | Jaganathan et al. |
| 2019/0114462 | A1* | 4/2019 | Jang .................. G06N 3/084 |
| 2019/0197406 | A1 | 6/2019 | Darvish Rouhani et al. |
| 2019/0279089 | A1 | 9/2019 | Wang |
| 2019/0325267 | A1 | 10/2019 | Chen |
| 2020/0034661 | A1 | 1/2020 | Kim et al. |
| 2020/0042796 | A1 | 2/2020 | Kim et al. |
| 2020/0059551 | A1 | 2/2020 | Kim et al. |
| 2020/0302303 | A1 | 9/2020 | Chen et al. |
| 2021/0117651 | A1 | 4/2021 | Kotake |

FOREIGN PATENT DOCUMENTS

| | | |
|---|---|---|
| JP | 4258268 B2 | 4/2009 |
| JP | 6760318 B2 | 9/2020 |
| KR | 10-2017-0092595 A | 8/2017 |
| KR | 10-2018-0045635 A | 5/2018 |
| KR | 10-2018-0075368 A | 7/2018 |
| KR | 10-2018-0134740 A | 12/2018 |
| KR | 10-2019-0094133 A | 8/2019 |
| KR | 10-2019-0103084 A | 9/2019 |
| KR | 10-2019-0106861 A | 9/2019 |
| KR | 10-2124171 B1 | 6/2020 |
| KR | 10-2163498 B1 | 10/2020 |
| WO | 2016/083657 A1 | 6/2016 |

OTHER PUBLICATIONS

Hahn, Sangchul, and Heeyoul Choi. "Gradient acceleration in activation functions." (2018). (Year: 2018).*
Hua, et al. "Channel Gating Neural Networks" arXiv preprint arXiv:1805.12549v1 (2018). (Year: 2018).*
Wen, Wei, et al. "Learning structured sparsity in deep neural networks." Advances in neural information processing systems 29 (2016). (Year: 2016).*
Srivastava, Rupesh K., et al. "Compete to compute." Advances in neural information processing systems 26 (2013). (Year: 2013).*
Ioffe, Sergey, and Christian Szegedy. "Batch normalization: Accelerating deep network training by reducing internal covariate shift." International conference on machine learning. pmlr, 2015. (Year: 2015).*
Ghosh et al.; Trusted Neural Networks for Safety-Constrained Autonomous Control; Cornell University; arXiv.org>cs>arXiv:1085.07075v1; May 18, 2018.
International Search Report dated May 13, 2021; International Appln. No. PCT/KR2021/001041.
Mladenov et al.; Solving Sudoku puzzles by using Hopfield neural networks; ResearchGate; Conference Paper, https://www.researchgate.net/publication/262170343; May 2011.
Yue et al.; Sudoku Solver by Q'tron Neural Networks; Dept. of Computer Science and Engineering, Tatung University Taipe; D.-S. Huang, K. Li, and G.W. Irwin (Eds.): ICIC 2006, LNCS 4113, pp. 943-952, 2006; Springer-Verlag Berlin Heidelberg 2006; Taiwan, R.O.C.
European Examination Report dated Jun. 16, 2023, issued in European Patent Application No. 19910158.5.
European Search Report dated Oct. 10, 2022; European Appln. No. 21747753.8—1203/4022526 PCT/KR2021001041.
Indian Office Action dated Dec. 5, 2022; Indian Appln. No. 202217029971.
Hua et al.; Channel Gating Neural Networks; XP080884351; arXiv:1805.12549v1 [cs.LG]; May 29, 2018.
European Search Report dated Nov. 19, 2021; European Appln. No. 19910158.5—1203/3852017 PCT/KR2019016235.
Indian Office Action dated May 17, 2024, issued in Indian Patent Application No. 202217029971.
European Office Action dated May 29, 2024, issued in European Patent Application No. 19 910 158.5—1203.
U.S. Office Action dated Aug. 5, 2024, issued by the U.S. Patent and Trademark Office U.S. Appl. No. 17/158,561.
Chinese Office Action dated Oct. 30, 2024, issued in Chinese Application No. 202180011639.8.

* cited by examiner

FIG. 5

| Method | COMPRESSION RATE (FLOPs) | ACCURACY (BEFORE PRUNING) | ACCURACY (AFTER PRUNING) | PERFORMANCE DROP (PRUNING BEFORE-AFTER) |
|---|---|---|---|---|
| (A) | 1.21 TIMES | 93.04% | 93.06% | +0.02% |
| (B) | TWICE | 92.8% | 91.8% | -1.00% |
| (C) | TWICE | 93.00% | 92.54% | -0.46% |

ELECTRONIC DEVICE AND CONTROL METHOD THEREFOR

TECHNICAL FIELD

This disclosure relates to an electronic device and a control method therefor and, more specifically, to an electronic device for performing a function of reducing a size of an artificial neural network by appending a layer including a learnable function to an artificial neural network, and a control method therefor.

BACKGROUND ART

Recently, an artificial neural network is widely used in various fields such as machine translation, voice recognition, image classification, or the like. Since the application width of the artificial neural network is gradually widened and a precise computation is required, the size and necessary computation amount of the artificial neural network has been increased exponentially. There is a limit in storing large-sized artificial neural network models on an on-device platform (e.g., a smart phone, an Internet of Things (IoT) device, or the like), and a technology of maintaining accuracy of computation while reducing the size and computational amount of an artificial neural network has been studied and developed. One representative technology is channel pruning to reduce the channel size of a layer of an artificial neural network.

In the related art, a channel pruning technology in which an absolute value sum of the weights of respective channels of a layer included in a convolutional neural network is calculated, and a channel is sequentially cut from a channel with a smaller sum of absolute values has been utilized. However, there is a limit that a channel having the smallest sum of the absolute values of the weight may not be the most unimportant channel in the artificial neural network.

In the related art, a channel pruning technology for finding an optimal combination by comparing all the channel combinations of layers of an artificial neural network has been utilized. However, in the related art technology, there is a limit that an exponential comparison computation should be performed in order to compare all channels of a layer of an artificial neural network.

In the related art, a soft gating technology where a trained weight having a real number between 0 and 1 is multiplied by each channel and a channel having a small value is eliminated is used. However, in the related art, there is a limit in that the weight has an intermediate value between 0 and 1 and thus the weight learning is not complete so that regularization or annealing algorithms should be additionally applied to the weight.

In the related art, although a variational method of learning a probability distribution parameter regarding whether respective channels are to be eliminated has been used, but whether the channel is to be eliminated depends on probability and thus, there is a limit that a mask should be repeatedly sampled.

DISCLOSURE

Technical Problem

It is an object of the disclosure to provide an electronic device to lighten an existing layer by appending a layer including a learnable function to a layer of an artificial neural network and using the learnable function and the trained parameter, and a control method thereof.

Technical Solution

An electronic device according to an embodiment includes a memory configured to store at least one instruction and a processor connected to the memory and configured to control the electronic device, and the processor, by executing the at least one instruction, may append a second layer including a learnable function to a first layer in an artificial neural network including a plurality of layers, update a parameter value included in the second layer by training the artificial neural network, obtain a function value by inputting the updated parameter value to the learnable function, and update the first layer to a third layer by eliminating at least one channel among a plurality of channels included in the first layer based on the obtained function value.

A control method of an electronic device according to an embodiment may include appending a second layer including a learnable function to a first layer in an artificial neural network including a plurality of layers, updating a parameter value included in the second layer by training the artificial neural network, obtaining a function value by inputting the updated parameter value to the learnable function, and updating the first layer to a third layer by eliminating at least one channel among a plurality of channels included in the first layer based on the obtained function value.

Effect of Invention

As described above, according to various embodiments, an electronic device may reduce the size of the artificial neural network and maintain the accuracy of the computation by performing pruning through appending a layer including a learnable function to a layer of the artificial neural network, even without comparing combinations of all channels. Therefore, a user may efficiently utilize a compressed artificial neural network in various fields through an electronic device that performs pruning.

DESCRIPTION OF DRAWINGS

FIG. 5 is a diagram illustrating an experiment result related to an electronic device according to an embodiment.

BEST MODE FOR CARRYING OUT THE INVENTION

Hereinbelow, various embodiments of the disclosure will be described with reference to drawings.

Figure 1A:
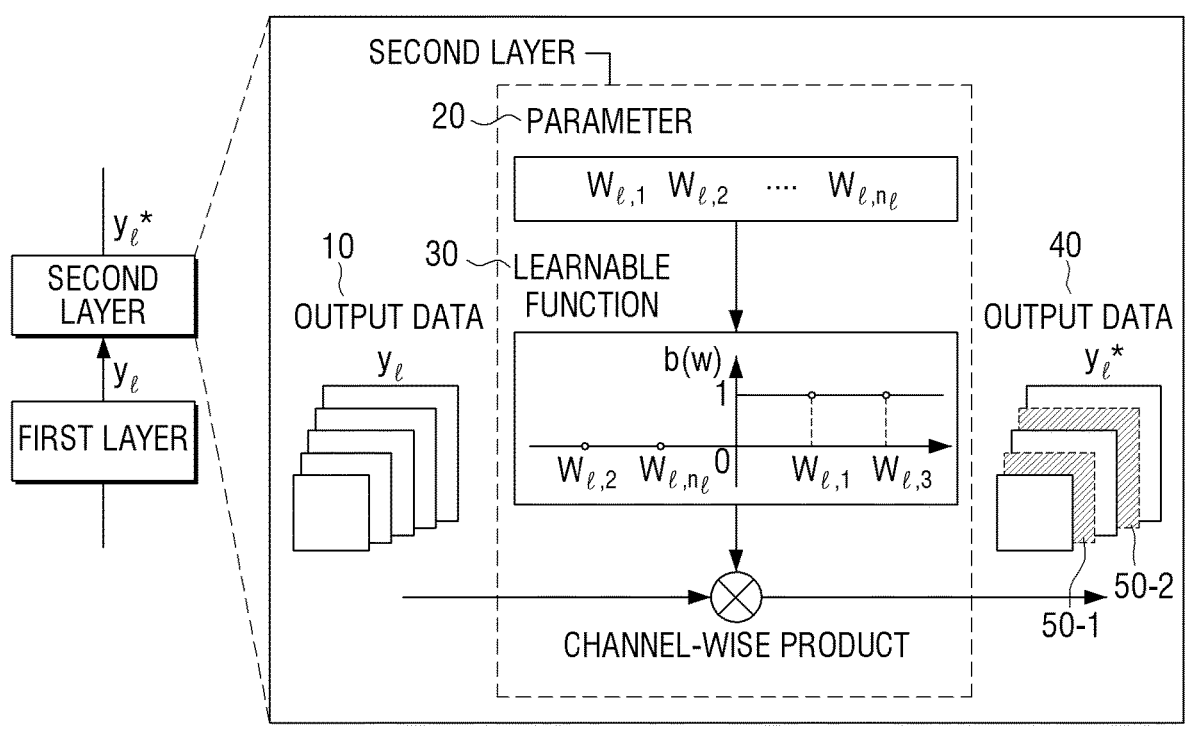
FIG. 1A is a diagram illustrating a control method of an electronic device according to an embodiment.

FIG. 1A is a diagram illustrating a method of controlling an electronic device 100 according to an embodiment. As shown in FIG. 1A, the electronic device 100 may store an artificial neural network including a plurality of layers. The layer may refer to each step of an artificial neural network. The plurality of layers included in the artificial neural network may have a plurality of weight values, and may perform a computation of a layer through a computation result of a previous layer and a computation of a plurality of weights. An artificial neural network may be composed of a combination of several layers, and the layer may be represented by a plurality of weights. A kernel is a set of weights included in one layer. In one embodiment, the kernel may be implemented as a tensor, which is a multi-dimensional matrix. The channel may refer to the last dimension when the kernel is implemented with a tensor. Thus, the channel may match the last dimension of the tensor representing an output value of a specific layer.

Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks. It is understood that the neural network according to various embodiments is not limited to the above-described example, unless specified otherwise.

The electronic device 100 may append a second layer including a learnable function 30 to a first layer among a plurality of layers included in the artificial neural network to compress the artificial neural network. According to an embodiment, the electronic device 100 may append a layer including a learnable function to all layers included in an artificial neural network. In another embodiment, when a first layer among a plurality of layers is selected according to a user command, the electronic device 100 may append the second layer to the selected first layer.

The second layer may include the learnable function 30 and a parameter 20 ($W_{1,1}, W_{1,2} \ldots W_{1,n}$). As shown in FIG. 1A, the parameter may denote a parameter for deriving a function value corresponding to the $i^{th}$ channel of the first layer. The learnable function 30 may be a function having a non-trivial differential value when the parameter 20 value defined in a real range is input. The learnable function 30 may be a function of adding a differential second function into a first function that outputs 0 or 1, and the second function may be a function obtained by multiplying a differential function and a function having a predetermined gradient. The first function may be a unit step function and the second function may be a Sawtooth function, but this is merely exemplary, and the second function may be implemented as a differential function of which the range of the output value is limited.

The electronic device 100 may input an arbitrary parameter value to the learnable function 30 to obtain 0 or 1 which is the same as the output value of the first function. In one embodiment, the electronic device 100 may obtain a function value 0 by inputting a negative parameter value to the learnable function 30, and may input a positive parameter value to the learnable function 30 to obtain a function value 1. This is merely exemplary and the electronic device 100 may obtain a value having a difference within a threshold range with 0 or 1 by inputting a negative or positive parameter value to the learnable function 30. A mathematical feature and verification associated with the learnable function 30 will be described in detail with reference to FIG. 4.

The electronic device 100 may train the artificial neural network and update the parameter 20 included in the second layer. The electronic device 100 may obtain output data 40 of the second layer by multiplying the function value obtained when the parameter 20 is input to the learnable function 30 of the second layer and the output data 10 of the first layer.

According to an embodiment, when the function value obtained through the learnable function 30 is 0, the electronic device 100 may perform a multiplication computation with a function value of 0 by a channel of the output data 10 of the first layer corresponding to the parameter 20 input to the learnable function 30. As shown in FIG. 1A, the output data 40 of the second layer may be data of which some of channels 50-1 and 50-2 among the output data 10 of the first layer are masked with zero.

Output data 10 and 40 of respective layers may be implemented with a tensor of a multi-dimensional matrix, but this is merely exemplary, and may be implemented with various formats (e.g., a vector, or the like).

The electronic device 100 may generate a loss function associated with a difference between an output value of the artificial neural network based on the output data 40 of the second layer and an output value to be obtained by the electronic device 100 and may obtain a parameter for outputting a minimum function value (i.e., a minimum loss value) of the generated loss function. In one embodiment, the electronic device 100 may apply a stochastic gradient descent algorithm to a loss function to obtain and update a parameter 20 value with minimized loss value. The stochastic gradient descent algorithm is an algorithm capable of obtaining a parameter value for outputting a minimum function value (loss value) in a loss function. The electronic device 100 may obtain a parameter value capable of outputting a minimum function value by applying various algorithms (e.g., a momentum algorithm, an adagrad algorithm, an adam algorithm, or the like) to a loss function, as well as a stochastic gradient descent algorithm. The electronic device 100 may update a parameter included in the second layer to a parameter that outputs a minimum function value of the loss function.

The loss function may be a function of adding an additional loss function indicating the size or computational complexity of a layer to be obtained after compression to a loss function to maximize the accuracy of the artificial neural network computation. In one embodiment, the loss function representing the size of the layer may be computed as the sum of the output values of the learnable function 30 included in the second layer, and the loss function representing the computational complexity of the layer may be computed as multiplication of the sum of the output values of the learnable function 30 included in the second layer by the size of the input value of the first layer. In another embodiment, the additional loss function may be implemented as a sum of weights of a loss function that represents the size of the layer or computational complexity.

The electronic device 100 may obtain a function value by inputting the updated parameter 20 into the learnable function 30, and update the first layer to a third layer by eliminating at least one channel among the plurality of channels included in the first layer based on the obtained function value. When a function value is obtained by inputting $W_{1,i}$ among the parameters to the learnable function 30, the electronic device 100 may identify whether to eliminate the $i^{th}$ channel of the first layer according to the obtained function value (0 or 1). If a function value of 0 is obtained by inputting $W_{1,i}$ among the parameters to the learnable function 30, the electronic device 100 may eliminate the $i^{th}$ channel of the first layer 10. Outputting 0 by inputting $W_{1,i}$ among the parameters to the learnable function 30 may mean that the $i^{th}$ channel of the first layer may mean an unimportant channel in the entire computation of the artificial neural network and thus may be eliminated by the electronic device 100. The overall size and computation amount of the artificial neural network may be reduced and the accuracy of the computation may be maintained. If a function value of 1 is obtained by inputting $W_{1,i}$ among the parameters to the learnable function 30, the electronic device 100 may maintain the $i^{th}$ channel of the first layer.

The electronic device 100 may eliminate the second layer and update to a third layer in which at least one channel among the plurality of channels included in the first layer is eliminated, based on the function value. However, this is merely exemplary, and the electronic device 100 may first update the first layer to the third layer and then may eliminate the second layer.

Figure 1B:
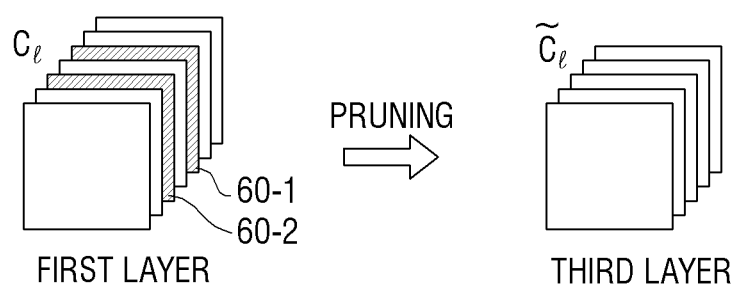
FIG. 1B is a diagram illustrating a result obtained when performing pruning for an artificial neural network by an electronic device according to an embodiment.

In one embodiment, as shown in FIG. 1B, the electronic device 100 may perform pruning by appending a second layer to the first layer, thereby updating the first layer to the third layer with reduced number of channels. The electronic device 100 may eliminate some of channels 60-1 and 60-2 included in the first layer based on the function value output from the learnable function so as to update the first layer to the third layer.

According to an embodiment, the electronic device 100 may obtain a function value by inputting the updated parameter 20 value to the learnable function 30, may change a weight of a first kernel based on the obtained function value, and may update the first kernel of the first layer to the second kernel including the changed weight.

The electronic device 100 may append a second layer having a learnable parameter 50 as much as the number of weights of the kernel of the first layer and train the artificial neural network to update the parameters. The electronic device 100 may identify whether to change the weight of the first kernel of the first layer to 0 according to the function value obtained by inputting the updated parameter to the learnable function 30. For example, if the first kernel of the first layer is implemented in the form of a three-dimensional 3×3×64 (i.e., a filter in a 3×3 format is implemented with 64 channels), the electronic device 100 may append, to the first layer, a second layer that includes the learnable parameter 20 in a matrix of 3×3×64 format which may correspond to a weight included in the first kernel in 1 to 1 manner. The electronic device 100 may update parameters by training an artificial neural network. If the function value obtained by inputting the updated parameter to the learning function 30 is 0, the electronic device 100 may change the weight of the first kernel of the first layer corresponding to the parameter input to the learnable function to 0. For example, if the parameter when outputting a function value of 0 corresponds to the weight of the (3,3,20) position of the first kernel, the electronic device 100 may change the weight of the (3,3,20) position of the first kernel to 0. If the obtained function value is 1, the electronic device 100 may maintain a weight of the first kernel of the first layer corresponding to the parameter input to the learnable function 30 as it is. Therefore, the electronic device 100 may change a portion of the weight of the first kernel of the first layer to 0, thereby reducing the amount of computation of the entire artificial neural network.

Figure 1C:
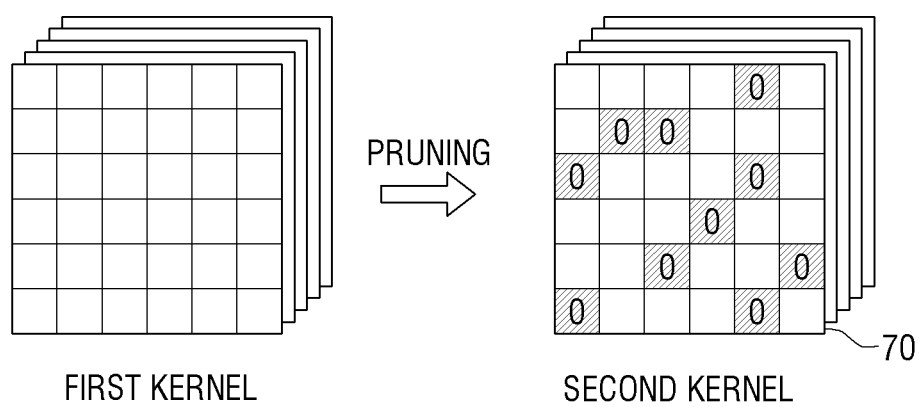
FIG. 1C is a diagram illustrating a result obtained when performing pruning for an artificial neural network by an electronic device according to an embodiment.

For example, as shown in FIG. 1C, the electronic device 100 may perform pruning by appending the second layer to the first layer, thereby changing a portion of the weight included in the first kernel of the first layer to 0, and updating the first kernel to the second kernel 70 including the changed weight.

In another embodiment, the electronic device 100 may reduce the amount of computation by removing a partial channel of the layer based on the function value obtained by inputting the updated parameter to the learnable function, possibly reducing the amount of computation by changing the weight of the individual kernel of the layer to 0, and lightening the artificial neural network by removing the specific layer.

The electronic device 100 may eliminate at least one layer among the plurality of layers included in the artificial neural network on the basis of the function value obtained by inputting the updated parameter 20 to the learnable function 30. For example, when the parameter which was input to the learnable function when outputting a function value of 0 corresponds to a first layer, the electronic device 100 may eliminate the first layer of the artificial neural network. When the parameter which was input to the learnable function when outputting the function value of 1 corresponds to the first layer, the electronic device 100 may maintain the first layer of the artificial neural network as it is.

Figure 1D:
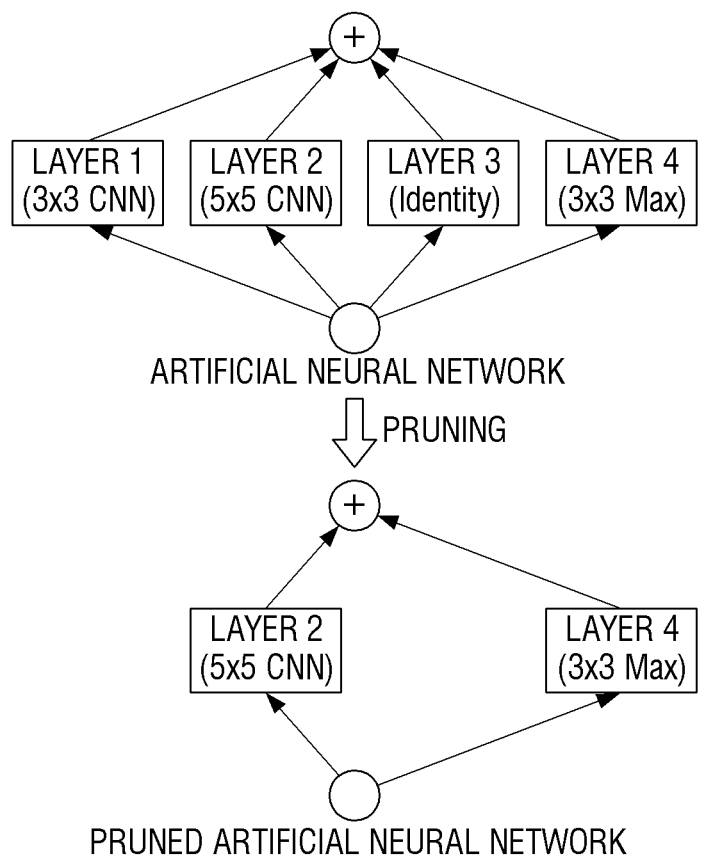
FIG. 1D is a diagram illustrating a result obtained when performing pruning for an artificial neural network by an electronic device according to an embodiment.

In one embodiment, as shown in FIG. 1D, the electronic device 100 may eliminate some of the plurality of layers by appending the second layer including the learnable function 30 to respective layers included in the artificial neural network. For example, if the function value obtained through the learnable function 30 is 0 and the parameter input to the learnable function 30 corresponds to the first and third layers, the electronic device 100 may lighten the artificial neural network by eliminating the first and third layers.

Figure 2A:
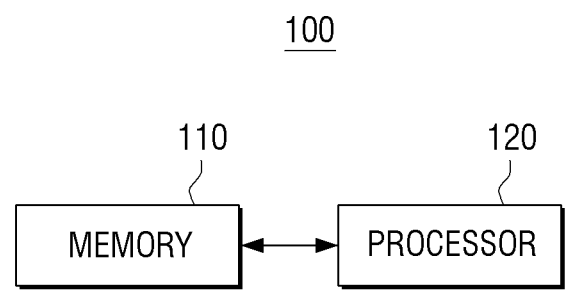
FIG. 2A is a block diagram briefly illustrating a configuration of an electronic device according to an embodiment.

FIG. 2A is a schematic diagram of the electronic device 100 according to an embodiment. As shown in FIG. 2A, the electronic device 100 may include a memory 110 and a processor 120. The configurations shown in FIG. 2A are exemplary for implementing embodiments, and any suitable hardware/software configurations that would be obvious to those skilled in the art may be further included in the electronic device 100.

The memory 110 may store instructions or data related to at least one other elements of the electronic device 100. The memory 110 may be implemented as a non-volatile memory, a volatile memory, a flash-memory, a hard disk drive (HDD), slid state drive (SSD), or the like. The memory 110 may be accessed by the processor 120, and may perform reading, recording, modifying, deleting, updating, or the like, of data by the processor 120. The term memory may include the read only memory (ROM), random access memory (RAM) in the processor 120, or a memory card (for example, micro secure digital (SD) card, a memory stick) mounted in the electronic device 100.

The memory 110 may store an artificial neural network including a plurality of layers, and may store kernel and parameters included in each layer. The memory 110 may store output data of respective layers and output data of the entire artificial neural network.

The processor 120 may be electrically connected to the memory 110 to control the overall operation and function of the electronic device 100. The processor 120 may perform at least one instruction stored in the memory 110 to append a second layer including a learnable function to a first layer of an artificial neural network including a plurality of layers, to update a parameter value included in the second layer by training the artificial neural network, to obtain a function value by inputting the updated parameter value to the learnable function, and update the first layer to the third layer by eliminating at least one channel among the plurality of channels included in the first layer based on the obtained function value.

The processor 120 may append a layer that includes a learnable function to all layers included in the artificial neural network to reduce the size of the artificial neural network. However, this is merely exemplary, and if a user command for selecting a specific layer is input through the inputter 130, the processor 120 may append a learnable function to the selected layer. The learnable function is a function of adding a differential second function into a first function outputting 0 or 1, and the second function may be a function obtained by multiplying the differential function by a function having a predetermined gradient. The mathematical feature and verification of the function will be described in detail with reference to FIG. 4.

The processor 120 may train an artificial neural network to update a parameter value included in the second layer. According to an embodiment, the processor 120 may obtain output data of the second layer by multiplying the function value of the learnable function included in the second layer and the output data of the first layer by channels. For example, if the parameter included in the second layer is ($W_{1,1}$, $W_{1,2}$ ... $W_{1,n}$), the processor 120 may obtain a function value by inputting ($W_{1,1}$, $W_{1,2}$ ... $W_{1,n}$) to the learnable function, and may obtain the output data of the second layer by multiplying the obtained function value by the first channel, the second channel, ... and the $n^{th}$ channel. The processor 120 may generate a loss function based on the obtained output data of the second layer. The processor 120 may obtain a parameter value that minimizes a function value (loss value) by applying a stochastic gradient descent algorithm to the loss function, and may update the existing parameter value to the obtained parameter value. However, the stochastic gradient descent algorithm is merely an embodiment, and the electronic device 100 may obtain a parameter value to have a minimum function value by applying various algorithms (e.g., a momentum algorithm, an adagrad algorithm, an adam algorithm, etc.) to a loss function.

The processor 120 may obtain a function value by inputting the updated parameter value to the learnable function. The processor 120 may obtain a function value by inputting the updated parameter value to a learnable function. For example, if the updated parameter value is negative, the processor 120 may input a parameter value, which is a negative function, to obtain a function value of 0. If the updated parameter value is positive, the processor 120 may input a parameter value, which is a positive function, to obtain a function value of 1. However, this is merely exemplary and the processor 120 may input a parameter value, which is a negative number or a positive value, to a learnable function to obtain a value having a difference within a threshold range of 0 or 1, respectively.

The processor 120 may eliminate at least one channel among the plurality of channels included in the first layer based on the obtained function value to update the first layer to the third layer. If the obtained function value is 0, the processor 120 may eliminate the kernel of the first layer corresponding to the parameter input to the learnable function. For example, when the parameter input when the function value of 0 is obtained is $W_{1,1}$, the processor 120 may delete the first channel of the first layer. When the parameter input if the function value of 1 is input is $W_{1,2}$, the processor 120 may maintain the second channel of the first layer as it is. The processor 120 may update the first layer to the third layer which eliminates or maintains a channel based on the function value.

The processor 120 may update the first layer to the third layer by eliminating the second layer and eliminating at least one channel among the plurality of channels included in the first layer based on the function value, but this is merely exemplary and may update the layer to the third layer and then may eliminate the second layer.

The processor 120 may obtain a function value by inputting the updated parameter value to a learnable function, change a weight of the first kernel of the first layer based on the obtained function value, and update the first kernel of the first layer to the second kernel including the changed weight. As an embodiment, if the function value obtained when the first kernel of the first layer is implemented as 3×3×64 matrix is 0, the processor 120 may change the weight of the first kernel of the first layer corresponding to the parameter input to the learnable function to 0. For example, if the parameter when the function value of 0 is output corresponds to the weight of the (3,3,20) position of the first kernel, the processor 120 may change the weight of the (3,3,20) position of the first kernel to 0. The processor 120 may maintain a weight of the (3,3,20) position of the first kernel if the parameter when the function value of 1 is output corresponds to the weight of the (3,3,20) position of the first kernel.

The processor 120 may be configured as one or a plurality of processors, and the processor 120 may be implemented as a general-use processor such as a central processing unit (CPU), an application processor (AP), a graphics-only processor such as a graphic processing unit (GPU), a vision processing unit (VPU), or the like, or an artificial intelligence (AI)-only processor such as a neural processing unit (NPU).

One or a plurality of processors control to process input data according to a predefined operating rule or AI model stored in the memory 110. The predefined operating rule or AI model is made through learning.

Here, being made through learning may indicate that a predetermined operating rule or an AI model with a desired feature is made by applying a training or learning algorithm to a plurality of training or learning data. The learning may be performed in a device itself in which AI according to an embodiment is performed, and may be implemented through a separate device or server/system.

The learning algorithm is a method for training a predetermined target device (e.g., a robot) using a plurality of learning data to cause the predetermined target device to make a determination or prediction by itself. Examples of learning algorithms include supervised learning, unsupervised learning, semi-supervised learning, or reinforcement learning, and the learning algorithm in the disclosure is not limited to the examples described above except when specified.

Figure 2B:
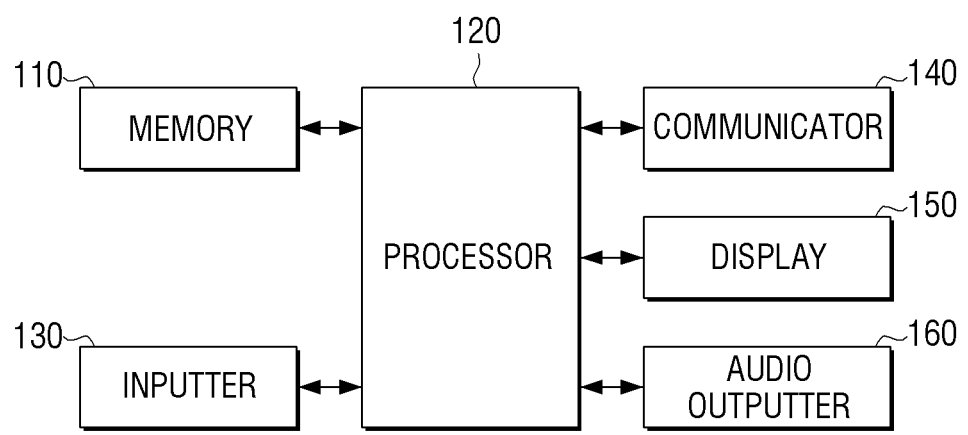
FIG. 2B is a block diagram illustrating a configuration of an electronic device in detail according to an embodiment.

FIG. 2B is a block diagram illustrating a configuration of the electronic device 100. As illustrated in FIG. 2B, the electronic device 100 may include the memory 110, the processor 120, the inputter 130, a communicator 140, a display 150, and an audio outputter 160. The memory 110 and the processor 120 which were described with reference to FIG. 2A will not be further described to avoid redundancy.

The inputter 130 may receive various user inputs and deliver the user inputs to the processor 120. The inputter 130 may include a touch sensor, a (digital) pen sensor, a pressure sensor, a key, or the like. The touch sensor may use, for example, at least one of electrostatic, resistive, infrared, or ultrasonic methods. A (digital) pen sensor may, for example, be part of a touch panel or include a separate recognition sheet.

As an embodiment, a user command to select the first layer, among the plurality of layers included in the artificial neural network, may be received through the inputter 130 to reduce the number of channels and the user command may be transmitted to the processor 120.

The communicator 140 may communicate with an external device through various communication methods. Communicatively connecting the communicator 140 with the external device may include communication via a third device (e.g., a relay, a hub, an access point, a server, a gateway, or the like).

The communicator 140 may include various communication modules to communicate with the external device. For example, the communicator 140 may include a wireless communication module, for example, a cellular communication module using at least one of long term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), or the like. As another example, the wireless communication module may include, for example, wireless fidelity (WiFi), Bluetooth, Bluetooth low energy (BLE), or ZigBee.

The display 150 may display various information according to the control of the processor 120. The display 150 may display an indicator notifying that the first layer is updated to the third layer according to the control of the processor 140.

The display 150 may be implemented as a touch screen along with a touch panel. The embodiment is not limited to the above implementation and the display 150 may be implemented differently according to the type of the electronic device 100.

The audio outputter 160 may be configured to output various alarm sounds or voice messages as well as various audio data for which various processing operations such as decoding, amplification, noise filtering, or the like, are performed by an audio processor (not shown). In an embodiment, the audio outputter 160 may output an audio signal indicating that the first layer is updated to the third layer.

The audio outputter 160 may be implemented as the speaker 160, but this is merely exemplary and may be implemented with another output terminal capable of outputting audio data.

Figure 3:
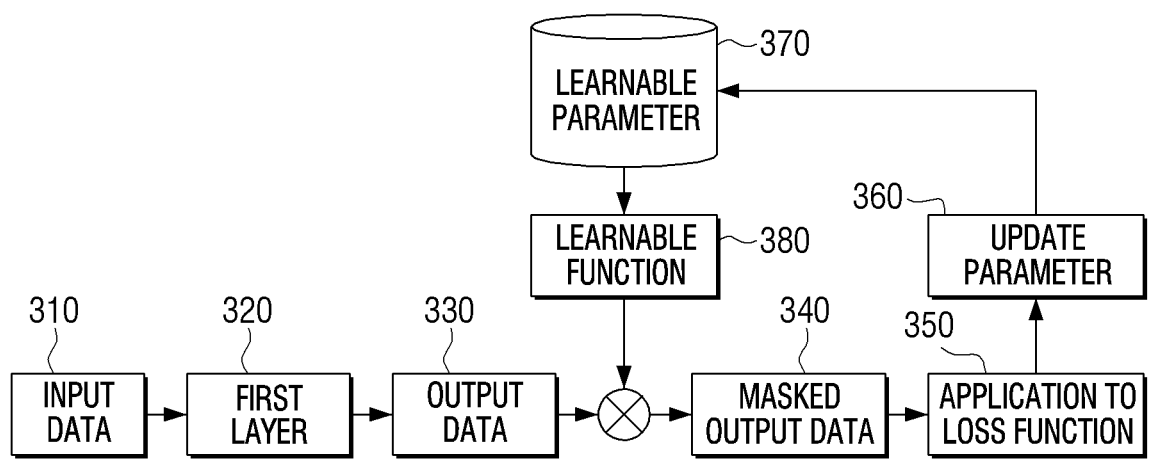
FIG. 3 is a diagram illustrating a learning method of an artificial neural network according to an embodiment.

FIG. 3 is a diagram illustrating a learning method of an artificial neural network including a plurality of layers stored in the electronic device 100 according to an embodiment.

For example, when input data 310 for training is received from the user or the external device, the electronic device 100 may input the input data 310 to a first layer 320 to obtain output data 330. The input data 310 may be image data or voice data, but is not limited thereto. The output data 330 may be a feature map obtained by performing a convolution operation between the kernel of the first layer 320 and the input data 310. The input data 310 and the output data 330 shown in FIG. 3 may be implemented in a tensor of a multi-dimensional matrix format, but the input data 310 and the output data 330 may be implemented in various forms (e.g., vectors, etc.).

The electronic device 100 may obtain the masked output data 340 by multiplying the function value obtained by inputting the learnable parameter 370 and the output data 330 by respective channels. For example, if the parameter ($W_{1,i}$) of the function value to be multiplied by the $i^{th}$ output data is negative, the electronic device 100 may obtain a function value of 0 by inputting a parameter value that is negative to the learnable function, and multiply the obtained function value of 0 by the $i^{th}$ output data. If the parameter ($W_{1,i}$) of the function value to be multiplied by the $i^{th}$ output data is positive, the electronic device 100 may obtain a function value of 1 by inputting a parameter value that is positive to the learnable function, and may multiply the obtained function value of 1 by the $i^{th}$ output data. The electronic device 100 may multiply the function value 0 or 1 by channels of the output data 330 to obtain the masked output tensor 340. The learnable function 380 and the learnable parameter 370 may be included in a second layer appended to the first layer.

The learnable function 380 may be a function of adding a differential second function to the first function outputting a discretized value such as a value of 0 or 1 or outputting −1 or 1, and the second function may be a function obtained by multiplying a differential function by a function having a predetermined gradient. The mathematical feature and verification associated with the learnable function will be described in detail with reference to FIG. 4.

According to one embodiment, the electronic device 100 may obtain a loss function based on the masked output data 340 and apply the stochastic gradient descent algorithm to the loss function to obtain a parameter that enables the function value (loss value) to be minimized. Since a method for obtaining a parameter having a minimum function value in a loss function through a stochastic gradient descent algorithm is a well-known art and a detailed description will be omitted. The electronic device 100 may update 360 an existing parameter to a newly obtained parameter.

If the additional input data 310 is input, the electronic device 100 may obtain the output data by inputting the input data to the first layer, and may obtain the masked output data by multiplying the function value obtained by inputting the obtained and updated parameter 370 to the learnable function included in the second layer by the output data for respective channels. The loss function may be obtained based on the masked output data as described above, and a parameter value which minimizes a loss function value by applying a stochastic gradient descent algorithm to the loss function may be obtained. The electronic device 100 may update an existing parameter to the obtained parameter. The electronic device 100 may learn the artificial neural network and update a parameter value, as shown in FIG. 3.

Figure 4:
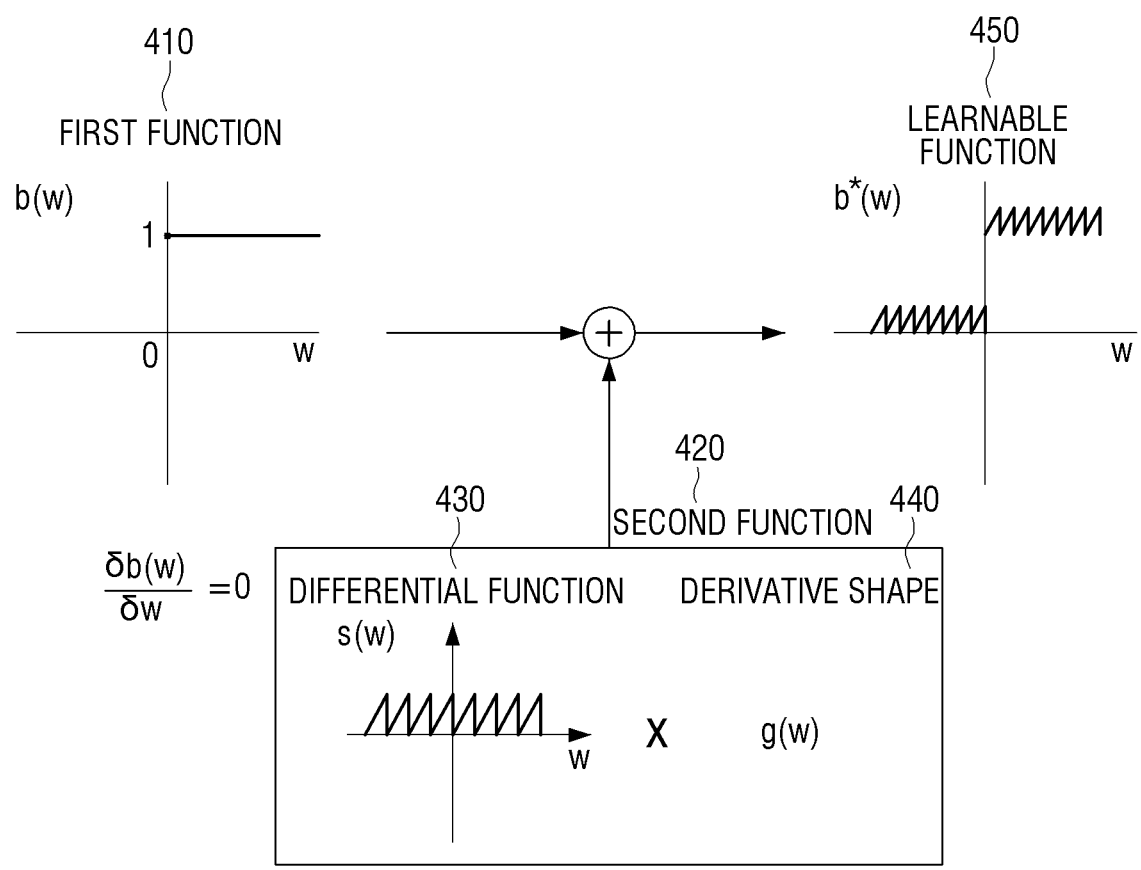
FIG. 4 is a diagram illustrating a learnable function included in a second layer according to an embodiment.

FIG. 4 is a diagram illustrating a learnable function included in a second layer according to an embodiment.

The learnable function 450 included in the second layer is a function that is obtained by adding the first function 410 outputting 0 or 1 and the differential second function 420. As shown in FIG. 4, the first function 410 may be a unit step function that outputs 0 when inputting a negative parameter value, and outputs 1 when inputting a positive parameter value. The embodiment is merely exemplary, and the first function 410 may be implemented with another function that outputs 0 or 1.

For example, when the first function 410 is implemented as a unit step function, the electronic device 100 may not train a parameter by applying a stochastic gradient descent algorithm utilizing differential to a loss function, since the differential value for the arbitrary parameter value is 0. Accordingly, the second differential function 420 may be added to the unit step function. The second function 420 may be a function obtained by multiplying the differential function 430 by a function having a predetermined gradient (or derivative shape) 440. The differential function 430 may be implemented as a function having a positive differential value with a limited range of an output value, and may include a Sawtooth function as an embodiment. In one embodiment, the second function 430, which is a differential function in which the differential function 430 is implemented as a Sawtooth function, is represented by Equation 1.

$$S^{(M)}(w) = \frac{M^*w - |M^*w|}{M} \quad \text{Equation 1}$$

Wherein M of Equation 1 represents a predetermined positive integer and a gradient value for arbitrary w (parameter) of Equation 1 is 1.

If the learnable function 450 is defined as $b^{(M)}(w;g)$ and the function 440 having a predetermined gradient is defined as $g^{(w)}$, the learnable function is as Equation 2.

$$b^{(M)}(w;g) = b(w) + s^{(M)}(w)*g(w) \quad \text{Equation 2}$$

When the value of M exceeds a threshold value (e.g., 10^5), when the learnable function 450 is implemented as in Equation 2, the learnable function 450 may output the function value which is the same as the first function or has an error within the threshold range with respect to the arbitrary w (parameter). The learnable function may output a gradient value which is identical with the function 440 having a predetermined gradient or a gradient value with an error within the same or threshold range as the function 440 having a predetermined gradient.

If M exceeds the threshold value, that the learnable function 450 may output the function value which is the same as the first function or having an error within a threshold range with respect to an arbitrary w (parameter) may be verified as Equation 3.

$$\left| b^{(M)}(w;g) - b(w) \right| = \left| s^{(M)}(w)*g(w) \right| \leq \frac{1}{M} |g(w)| \to 0 \quad \text{Equation 3}$$

If M exceeds the threshold value, that the learnable function 450 may output the gradient value which is the same as the function having a preset gradient or having an error within a threshold range with respect to an arbitrary w (parameter) may be verified as Equation 4.

$$\left| b^{(M)}(w;g)' - g(w) \right| =$$

$$\left| s^{(M)}(w)' * g(w) + s^{(M)}(w)g(w)' - g(w) \right| = \left| s^{(M)}(w)g(w)' \right| \leq \frac{1}{M} |g(w)'| \to 0 \quad \text{Equation 4}$$

According to an embodiment, since the M value of the second function exceeds a threshold value, the learnable function 450 may output a function value which is the same as the first function or a function value having an error within the threshold range with respect to an arbitrary w (parameter), and may output a gradient value which is the same as the function 440 having a predetermined gradient or having an error within he threshold range as the function 440 having a predetermined gradient. If a parameter, which is a negative number or a positive number, is input to the learnable function 450, the electronic device 100 may output a function value of 0 or 1, or output a function value in which an error within a range of 0 or 1 and a threshold range is generated. Since the differential value of the learnable function 450 is not 0, the artificial neural network may be trained by applying a stochastic gradient descent method to the artificial neural network to update the parameter value included in the second layer.

FIG. 5 is a diagram illustrating experimental results related to the electronic device 100, according to an embodiment. Specifically, FIG. 5 is a diagram for comparing an experimental result (compression rate and accuracy of computation after compression and compression) in a manner different from that of the method in which the electronic device 100 compresses the first layer. Floating point operations (FLOPs) are the ratio obtained by dividing the computation amount of the related-art artificial neural network by the computation amount of the artificial neural network which is compressed by appending the learnable second layer. Therefore, the greater the compression ratio, the more the artificial neural network has been compressed.

FIG. 5 illustrates an experimental result when the electronic device 100 compresses an artificial neural network structure, which is the ResNet-56(v2) in the CIFAR-10 data set in various ways. (A) method denotes compression of an artificial neural network by obtaining a sum of absolute values of weights for respective channels associated with a kernel of a layer included in an artificial neural network, and eliminating a kernel with a smaller sum of absolute values. (B) method denotes compression of an artificial neural network by multiplying each channel of a layer by a trained weight having a real value between 0 and 1 and eliminating a channel with a small value. (C) method denotes compression of an artificial neural network according to the control method of the electronic device 100 described above.

As shown in FIG. 5, the compression rate of the artificial neural network of (A) method is 1.21 times, but in (C) method, the compression rate is twice. In addition, in (B) method, the artificial neural network compression ratio is equal to or within an error range with the (C) method, there is a difference in the accuracy of computation after compression of an artificial neural network. In (B) method, accuracy drops by 1% point after compression of the artificial neural network, whereas, in (C) method, the accuracy of computation drops by about 0.46%. That is, through the experimental results of FIG. 5A, it may be identified the compression rate of the artificial neural network and accuracy of computation after compression of the method (C) is higher than (A) and (B) methods.

Figure 6:
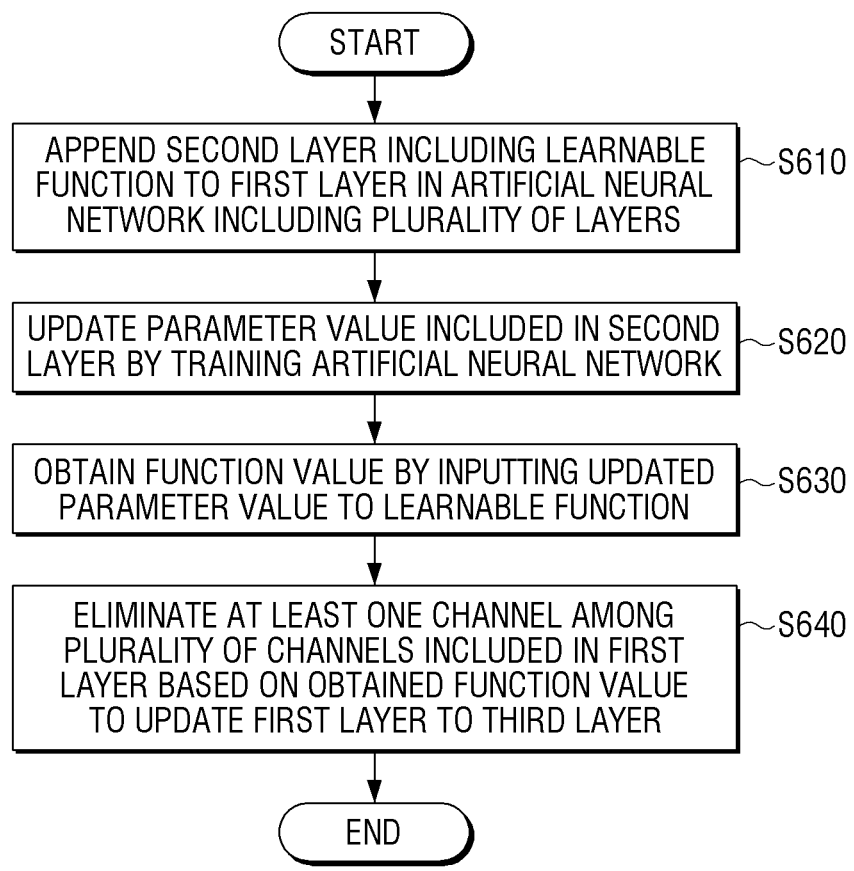
FIG. 6 is a diagram illustrating a control method of an electronic device according to an embodiment.

FIG. 6 is a flow chart illustrating a control method of the electronic device 100 according to an embodiment.

The electronic device 100 may connect a second layer including a learnable function to a first layer among an artificial neural network including a plurality of layers in operation 5610. In one embodiment, the electronic device 100 may connect a layer including a learnable function to all layers included in the artificial neural network, respectively. According to another embodiment, when a user command for selecting a layer to reduce the size of a channel is input, the electronic device 100 may connect a layer including a learnable function to the selected layer. The learnable function is a function that is obtained by adding a first function outputting 0 or 1 to a differential second function, and the second function is a function that is obtained by multiplying a differential function by a function having a predetermined gradient. The mathematical feature of the function has been described with reference to FIG. 4 and will not be further described.

The electronic device 100 may update the parameter value included in the second layer by training the artificial neural network in operation 5620. The electronic device 100 may obtain output data of the second layer by multiplying the channel-wise function value by output data of the first layer, generate a loss function based on the output data of the second layer, and obtain a parameter to output a minimum function value of the loss function. For example, the electronic device 100 may obtain a parameter to output a minimum function value of the loss function by applying a stochastic gradient descent to the loss function and may update the parameter to the obtained parameter.

In operation 5630, the electronic device 100 may obtain a function value by inputting the updated parameter value to the learnable function in operation 5630. The electronic device 100 may update the first layer to the third layer by eliminating at least one channel among the plurality of channels included in the first layer based on the obtained function value in operation 5640. In one embodiment, when the updated parameter value is negative, the electronic device 100 may obtain a function value 0 by inputting a parameter value that is a negative function to the learnable function, and may eliminate a kernel of the first layer corresponding to the parameter. For example, if a parameter, which is a negative number input to the learnable function, is $W_{1,i}$, the electronic device 100 may obtain a function value 0 and eliminate the $i^{th}$ channel of the first layer. If the parameter, which is a positive value input to the learnable function, is $W_{1,i}$, the electronic device 100 may obtain a function value 1 and maintain the $i^{th}$ channel of the first layer as it is.

The electronic device 100 may eliminate the second layer appended to the first layer and eliminate at least one channel among the plurality of channels included in the first layer based on the function value to obtain the channel pruned third layer from the first layer. However, this is an example and the second layer may be eliminated after updating the first layer to the third layer.

Hereinafter, embodiments of the disclosure will be described with reference to the accompanying drawings. However, it may be understood that the disclosure is not limited to the embodiments described hereinafter, but include various modifications, equivalents, and alternatives of the embodiments of the disclosure. For the description of the drawings, similar reference numerals may be used for similar constituent elements.

In the disclosure, the term "has," "may have," "includes" or "may include" indicates existence of a corresponding feature (e.g., a numerical value, a function, an operation, or a constituent element such as a component), but does not exclude existence of an additional feature.

In the disclosure, the term "A or B," "at least one of A or/and B," or "one or more of A or/and B" may include all possible combinations of the items that are enumerated together. For example, the term "A or B", "at least one of A and B", or "at least one of A or B" may designate (1) at least one A, (2) at least one B, or (3) both at least one A and at least one B.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

Herein, the expression "configured to" may be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device may perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that may perform the corresponding operations by executing one or more software programs stored in the memory device.

The electronic device according to various embodiments may include, for example, a smartphone, a tablet personal computer (PC), a desktop PC, a laptop PC, a netbook computer, a server, a personal digital assistant (PDA), a medical device, a camera, or a wearable device. In some embodiments, the electronic device may include at least one of, for example, a television, a refrigerator, air-conditioner, an air purifier, a set top box, a media box (e.g., SAMSUNG HOMESYNC™, APPLE TV™, or GOGGLE TV™.

A term user may refer to a person using an electronic device or a device (e.g., an artificial intelligence electronic device) using the electronic device. Hereinbelow, the disclosure will be described in greater detail with reference to drawings.

Here, various embodiments of the disclosure may be implemented in software, including instructions stored on machine-readable storage media readable by a machine (e.g., a computer). An electronic apparatus, including the electronic apparatus 100 and 200, may call instructions from the storage medium and execute the called instruction according to the embodiments of the disclosure. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which data is semi-permanently stored in a storage medium from the case in which data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to embodiments of the disclosure, the respective elements (e.g., module or program) of the elements mentioned above may include a single entity or a plurality of entities. Furthermore, at least one element or operation from among the corresponding elements mentioned above may be omitted, or at least one other element or operation may be added. Alternatively or additionally, a plurality of components (e.g., module or program) may be combined to form a single entity. As such, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

What is claimed is:

1. An electronic device comprising:
   a memory configured to store at least one instruction; and
   a processor connected to the memory and configured to control the electronic device,
   wherein the processor, by executing the at least one instruction, is further configured to:
      append a second layer including a trainable function to a first layer in an artificial neural network including a plurality of layers, wherein the trainable function is obtained by adding a first function outputting 0 or 1 to a differentiable second function and the differentiable second function is obtained by multiplying a differentiable function by a function having a predetermined gradient,
      obtain a first function value by inputting parameter value of the second layer to the trainable function,
      obtain output data of the second layer by multiplying output data of the first layer by the first function value channel-wise,
      generate a loss function based on the output data of the first layer and the output data of the second layer,
      obtain parameter value that outputs minimum function value of the loss function,
      update the parameter value of the second layer to the obtained parameter value that outputs the minimum function value of the loss function,
      obtain a second function value by inputting the updated parameter value to the trainable function, and
      update the first layer to a third layer by eliminating at least one channel among a plurality of channels included in the first layer based on the obtained second function value,
   wherein the loss function is a function of adding an additional loss function indicating a size or computational complexity of a layer of the artificial neural network to be obtained after compression of the artificial neural network to a loss function using a sum of output values of the trainable function.

2. The electronic device of claim 1, wherein the processor is further configured to:
   based on the updated parameter value being negative, obtain a function value of 0 by inputting a negative parameter value to the trainable function, and
   based on the updated parameter value being positive, obtain a function value of 1 by inputting a positive parameter value to the trainable function.

3. The electronic device of claim 2, wherein the processor is further configured to:
   based on the obtained function value of 0, eliminate a channel of the first layer corresponding to the parameter value input to the trainable function; and
   based on the obtained function value of 1, maintain the channel of the first layer corresponding to the parameter value input to the trainable function.

4. The electronic device of claim 1, wherein the processor is further configured to update the first layer to a third layer by eliminating the second layer and eliminating the channel of the first layer based on an obtained function value.

5. The electronic device of claim 1, wherein the processor is further configured to:
   obtain a function value by inputting the updated parameter value to the trainable function;
   change a weight of a first kernel of the first layer based on the obtained function value; and
   update the first kernel of the first layer to a second kernel including the changed weight.

6. The electronic device of claim 5, wherein the processor is further configured to:
   based on the obtained function value being 0, change a weight of the first kernel of the first layer corresponding to the parameter value input to the trainable function to 0; and
   based on the obtained function value being 1, maintain the weight of the first kernel of the first layer corresponding to the parameter value input to the trainable function.

7. A control method of an electronic device, the method comprising:
   appending a second layer including a trainable function to a first layer in an artificial neural network including a plurality of layers, wherein the trainable function is obtained by adding a first function outputting 0 or 1 to a differentiable second function and the differentiable second function is obtained by multiplying a differentiable function by a function having a predetermined gradient;
   obtaining a first function value by inputting parameter value of the second layer to the trainable function;
   obtaining output data of the second layer by multiplying output data of the first layer by the first function value channel-wise;
   generating a loss function based on the output data of the first layer and the output data of the second layer;
   obtaining parameter value that outputs minimum function value of the loss function;
   updating the parameter value of the second layer to the obtained parameter value that outputs the minimum function value of the loss function;
   obtaining a second function value by inputting the updated parameter value to the trainable function; and
   updating the first layer to a third layer by eliminating at least one channel among a plurality of channels included in the first layer based on the obtained second function value,
   wherein the loss function is a function of adding an additional loss function indicating a size or computational complexity of a layer of the artificial neural network to be obtained after compression of the artificial neural network to a loss function using a sum of output values of the trainable function.

* * * * *